United States Patent [19]
Koike et al.

[11] Patent Number: 5,726,876
[45] Date of Patent: Mar. 10, 1998

[54] INFORMATION COMMUNICATING SYSTEM AND METHOD

[75] Inventors: Masao Koike, Higashihiroshima; Tatsuro Morimoto, Hiroshima, both of Japan

[73] Assignee: Mazda Motor Corporation, Hiroshima, Japan

[21] Appl. No.: 504,499

[22] Filed: Jul. 20, 1995

[30] Foreign Application Priority Data

Jul. 26, 1994 [JP] Japan ............................. 6-174293
Jun. 30, 1995 [JP] Japan ............................. 7-165707

[51] Int. Cl.$^6$ ........................ G05B 15/00; G05B 19/18
[52] U.S. Cl. .............. 364/131; 395/200.01; 395/200.02; 370/389; 370/85.7
[58] Field of Search ........................ 364/131, 284, 364/284.3, 284.4, 229, 242.94, 514 C; 370/389, 400, 412, 431, 352; 395/200.01, 200.02, 200.17, 200.19

[56] References Cited

U.S. PATENT DOCUMENTS

| | | | |
|---|---|---|---|
| 4,626,843 | 12/1986 | Szeto et al. | 370/85 |
| 4,875,208 | 10/1989 | Furuhashi et al. | 370/94.1 |
| 4,903,261 | 2/1990 | Baran et al. | 370/94.2 |
| 4,905,229 | 2/1990 | Kato | 370/85.7 |
| 5,095,480 | 3/1992 | Fenner | 370/94.1 |
| 5,285,448 | 2/1994 | Nakayama et al. | 370/85.15 |
| 5,513,324 | 4/1996 | Dolin, Jr. et al. | 395/200.18 |
| 5,572,419 | 11/1996 | Nishimura | 364/131 |

FOREIGN PATENT DOCUMENTS 2-232703  9/1990  Japan.

*Primary Examiner*—Emanuel T. Voeltz
*Assistant Examiner*—Bryan Bui

[57] ABSTRACT

A host computer writes a page code corresponding to a desired page in page designation areas R1 to R32 in a brief datalink area P in a communication packet so as to receive necessary detailed information from each of producing machines #1 to #32, and sends the communication packet to the producing machines. Each producing machine always supervises the page designation areas R1 to R32 in the communication packet received from the host computer. Further, each producing machine writes the detailed information of a page corresponding to the page code written in the data designation areas R1 to R32 in a detailed datalink area Q as well as writes a page code of the page of the detailed information, written in the detailed datalink area Q, in the page designation areas R1 to R32. Thereby, it is possible to interchanges necessary information between the host computer and each of the plurality of producing machines at high speed.

25 Claims, 13 Drawing Sheets

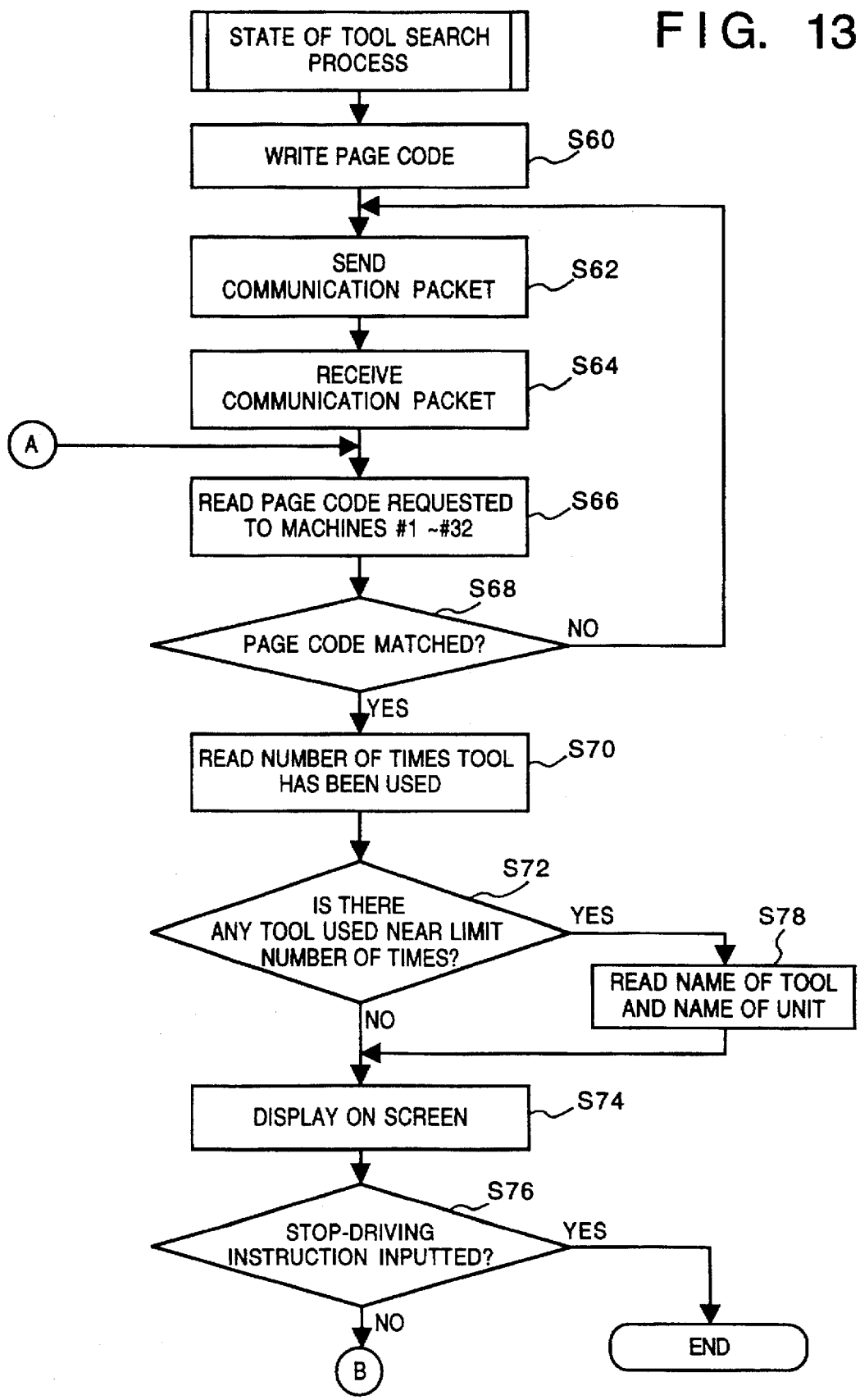

INFORMATION COMMUNICATING SYSTEM AND METHOD

BACKGROUND OF THE INVENTION

The present invention relates to an information communicating system and method and, more particularly, to an information communicating system and method which interchange all kinds of information as a communication packet of a predetermined size among a plurality of communication nodes connected to a common communication line.

In an assembly line which includes a plurality of machines for processing and producing unfinished products in a factory (the machines are called as "producing machines, hereinafter), where each processing and producing machine performs particular assigned processing and assembling, a network system using a LAN in which each processing and producing machine is connected to a common communication line and a host computer supervises collectively all the connected machines is conventionally adopted. By using the above-described LAN system, it is possible to supervise the entire production line with relatively small number of operators, thereby reducing personnel expenses. Further, since the production line can be automated, cost for producing finished products can be reduced.

In Japanese Patent Application Laid-Open No. 2-232703, there is disclosed a network system in which a host computer which has a control program that is common to the manufacturing devices, process commands for the producing devices that are different from each other controls the manufacturing devices by interchanging communication packets between the host computer (master node) and each manufacturing device (slave node), where the host computer generates the communication packets made of the process commands by using the control program, and sends and receives the communication packets to/from each manufacturing device.

However, in the aforesaid LAN system for the production line, the host computer has to request each producing machine to send back information in order to obtain necessary information on each producing machine, and each producing machine sends necessary information to the host computer in response to the request. Therefore, in a case where the large number of the producing machines is connected to the network, it takes a long time to send request from the host computer to each producing machine, thus the necessary information cannot be interchanged within a predetermined time period. As a result, there is a problem that the host computer cannot supervise all the producing machines.

Further, even though the communication packet for control which is disclosed in the Japanese Patent Application Laid-Open No. 2-232703 is used, since the communication packet can include a fixed amount of information, it is not possible for the host computer to supervise the entire system of the production line within a short predetermined time period.

SUMMARY OF THE INVENTION

The present invention has been made in consideration of the above situation, and has as its object to provide an information communicating system and method capable of interchanging various kinds of information, needed by a master node, between the master node and other nodes at high speed.

According to the present invention, the foregoing object is attained by providing an information communicating apparatus comprising: communication packet of predetermined size; and a first communication node, wherein the communication packet consists of: a first area for predetermined item information written by each of a plurality of communication nodes which include the first communication node; and a second area for detailed information relating to the predetermined item information for each of the plurality of communication nodes, and wherein the first communication node which is included in the plurality of communication nodes consists of: generating means for generating the communication packet for designating necessary predetermined item information and necessary detailed information to be written in the communication packet; and sending means for sending the generated communication packet to a second communication node which is included in the plurality of communication nodes, further wherein the predetermined item information stored in each of the plurality of communication nodes is interchanged by using the communication packet via a common communication line to which the plurality of communication nodes are connected.

Further, the foregoing object is also attained by providing an information communicating apparatus comprising: communication packet of predetermined size; and a second communication node, wherein the communication packet consists of: a first area for predetermined item information written by each of a plurality of communication nodes which include a first communication node; and a second area for detailed information relating to the predetermined item information for each of the plurality of communication nodes, and wherein the second communication node which is included in the plurality of communication nodes consists of: receiving means for receiving the communication packet sent from the first communication node which is included in the plurality of communication nodes, writing means for writing the necessary detailed information designated by the first communication node in the second area in the communication packet; and sending means for sending the communication packet to the first communication node, further wherein the information communicating apparatus receives the communication packet which holds the predetermined item information stored in the first communication node and which is sent from the first communication node via a common communication line to which the plurality of communication nodes are connected.

Furthermore, the foregoing object is also attained by providing an information communicating method in which predetermined item information stored in each of a plurality of communication nodes is interchanged by using a communication packet via a common communication line to which the plurality of communication nodes are connected, wherein the communication packet consists of: a first area for predetermined item information written by each of the plurality of communication nodes which include the first communication node; and a second area for detailed information relating to the predetermined item information for each of the plurality of communication nodes, performs: a designating step of designating necessary predetermined item information and necessary information corresponding to the designated predetermined item information, both of which are to be written in the communication packet; and a sending step of sending the communication packet, in a first communication node which is included in the plurality of communication nodes, and further performs: a receiving step of receiving the communication packet sent from the first communication node; a writing step of writing the necessary detailed information designated by the first communication node in the second area in the communication packet; and a sending step of sending the communication packet to a first communication node, in a second communication node which is included in the plurality of communication nodes.

As described above, according to the present invention, the communication packet has a first area for storing predetermined information by each communication node and a second area for storing detailed information relating to the predetermined information by each communication node, and the first communication node sends the communication packet designating the aimed predetermined information and its corresponding aimed detailed information to the second communication node, then the second communication node receives the communication packet sent from the first communication node, writes the aimed detailed information designated by the first communication node in the second area in the communication packet and sends the packet. Therefore, it is possible to minimize size of the communication packet, thereby interchanging various kinds of necessary information between communication nodes at high speed.

Other objects and advantages besides those discussed above shall be apparent to those skilled in the art from the description of a preferred embodiment of the invention which follows In the description, reference is made to accompanying drawings, which form apart thereof, and which illustrate an example of the invention. Such example, however, is not exhaustive of the various embodiments of the invention, and therefore, reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a flowchart of a subroutine explaining an operational sequence to detect state of tool of each unit performed by the host computer.

DETAILED DESCRIPTION OF THE PREFERRED EMBODIMENT

Preferred embodiment of the present invention will be described in detail in accordance with the accompanying drawings. It should be noted that, in the following embodiment, an information communicating system of the present invention is applied to a production line of a factory, however, the present invention is not limited to the following embodiment.

<System Configuration>

Figure 1:
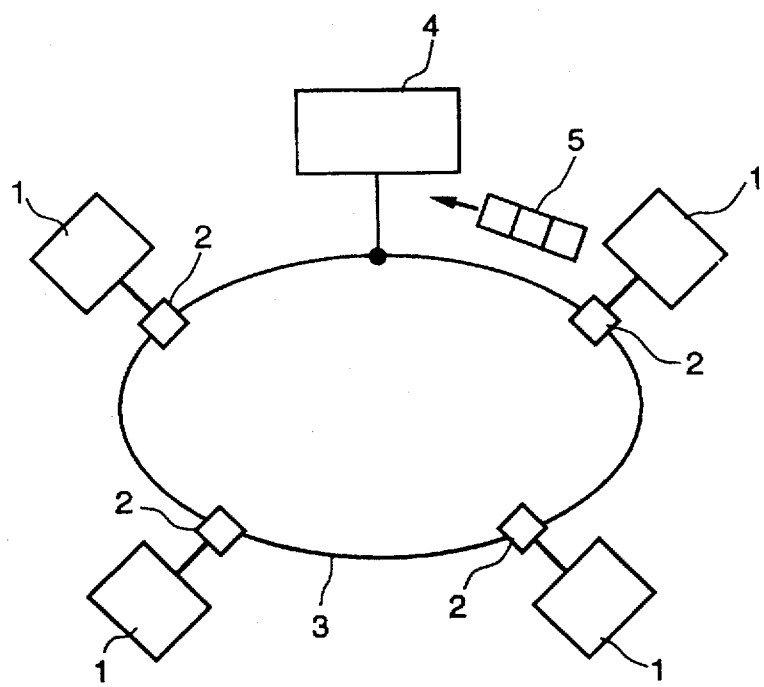
FIG. 1 is an overall view of an information communicating system according to an embodiment of the present invention.

FIG. 1 is an overall view of an information communicating system according to the embodiment of the present invention. Further, FIG. 2 is a block diagram showing the information communicating system of a producing machine used in FIG. 1.

Figure 2:
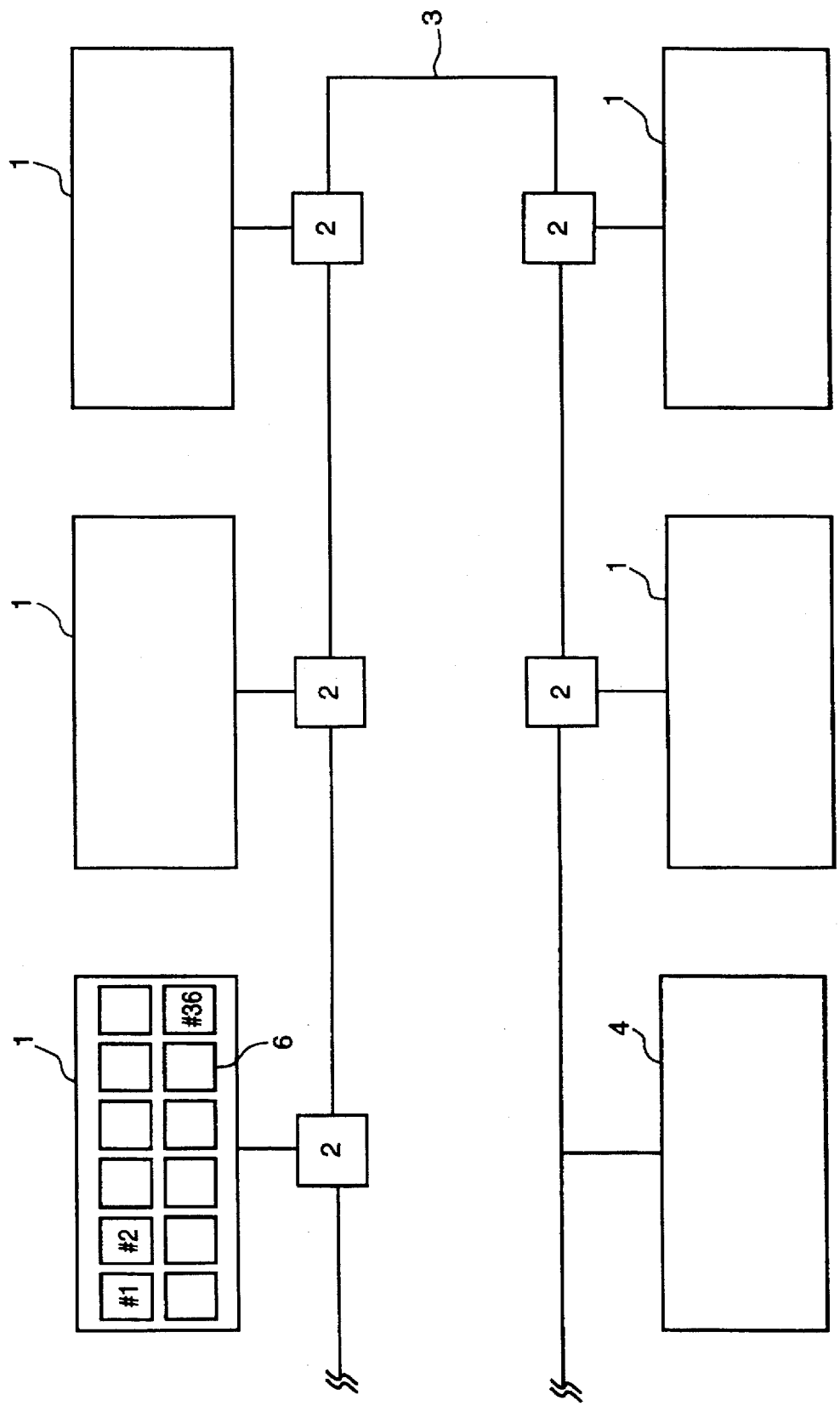
FIG. 2 is a block diagram showing a configuration of a producing machine constructing the information communicating system shown in FIG. 1.

Referring to FIGS. 1 and 2, the production line of the factory, explained as an embodiment, consists of a plurality of (32, for instance) producing machines 1 which process and assemble parts of products. Each producing machine 1 has a sequencer 2, and by connecting the sequencer 2 of each producing machine 1 to a common communication line 3, a ring-shape communication network system 10 is constructed. A host computer 4 which manages the entire network system 10 by controlling producing machines 1 is also connected to the network system 10 via the communication line 3. Further, a communication packet 5 of a predetermined size (e.g., 3 Kbytes) circulates among the host computer 4 and each producing machine as interchanging data on the communication line 3 of the network system 10. The communication packet 5 is generated in such a manner that a massage from the host computer 4 or from each producing machine 1 is divided by a fixed data length, and address data indicating the originated node and destination is attached to the divided massage. In the network system 10 in this embodiment, each producing machine 1 is a slave node which is supervised by the host computer 4, and the host computer 4 is a master node which supervises each producing machine 1. Further, each producing machine 1 consists of a plurality of (e.g., 36) units 6, as shown in FIG. 2. Each unit 6 is responsible for assigned processing and assembling operation on unfinished products, and the processing and assembling operation on the unfinished products is controlled by the sequencer 2 which is provided on each producing machine, so as to be sequentially performed.

<Data Construction of a Communication Packet>

Figure 3:
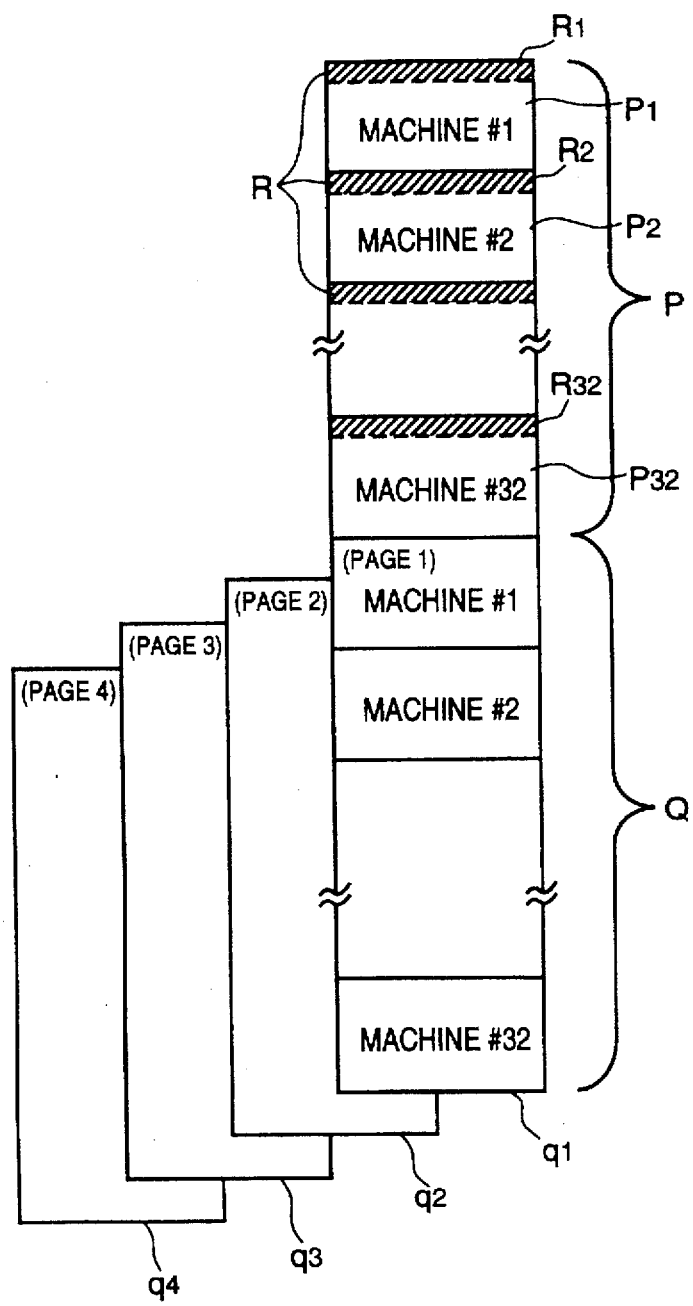
FIG. 3 is a diagram showing a brief data construction of a communication packet.

Next, a construction of data which is to be written in the aforesaid communication packet will be explained. FIG. 3 is a diagram showing a brief data construction of the communication packet.

As shown in FIG. 3, the communication packet 5 consists of a brief datalink area P whose size is about 256 bytes for increasing communication speed and a detailed datalink area Q whose size is about 2048 bytes. In these areas P and Q, various kinds of brief information and detailed information, each of producing machines #1 to #32 which will be described later, are written. More specifically, various kinds of the brief information on each of the producing machines #1 to #32 is written in the brief datalink area P, whereas the detailed information corresponding to the brief information written in the brief datalink area P is written in the detailed datalink area Q.

The information written in the brief datalink area P is data which is common to the producing machines #1 to #32, and the information written in the detailed datalink area Q is data which is specific to each of producing machines #1 to #32. The contents of the information written in the detailed datalink area Q are information to be stored in one of areas q1 to q4, stored in each of producing machine #1 to #32, in accordance with a designation by the host computer 4, the master node. More particularly, since each kind of the detailed information on the producing machines #1 to #32 is stored in respective page in the producing machines #1 to #32 so that the host computer 4 is able to designate a particular kind of detailed information by designating the page, information in a designated page out of pages, stored in the producing machines #1 to #32 (i.e., information written in one of the areas q1 to q4) is written in the detailed datalink area Q. Further, at the top portions R1 to R32 of areas P1 to P32 in the brief datalink area P where the brief information of the respective producing machines #1 to #32 is written, page designation areas R used for designating a particular page of the detailed information on the producing machines #1 to #32 from the host computer 4 is provided.

The host computer 4 writes a page code of a desired page in the page designation areas R1 to R32 of the brief datalink area P in order to receive necessary detailed information from the producing machines #1 to #32, and sends the communication packet to the producing machines. Each of the producing machines #1 to #32 always checks respective page designation areas R1 to R32 of the communication packet sent from the host computer 4, and writes detailed information, stored in a page corresponding to the page code which is designated in the page designation areas R1 to R32, in the detailed datalink area Q. Meanwhile, in the page designation area R1 to R32, each producing machine writes a page code corresponding to a page of the detailed information which is written in the detailed datalink area Q. When the host computer 4 receives the communication packet 5 which has circulated through the producing machines #1 to #32, it determines whether or not the page codes written in the page designation areas R1 to R32 by the producing machines match the page code designated by the host computer. Accordingly, the host computer can confirm the contents of the received detailed information on the producing machines, thus it can receive necessary information on the producing machines.

Further, as described above, if a size of the communication packet 5 is reduced so as to increase a communication speed, since only the detailed information on each producing machine designated by the host computer is transmitted through the communication line 3, large amount of information can be accurately interchanged at high speed.

<Details of Information Written in the Communication Packet>

Figure 4:
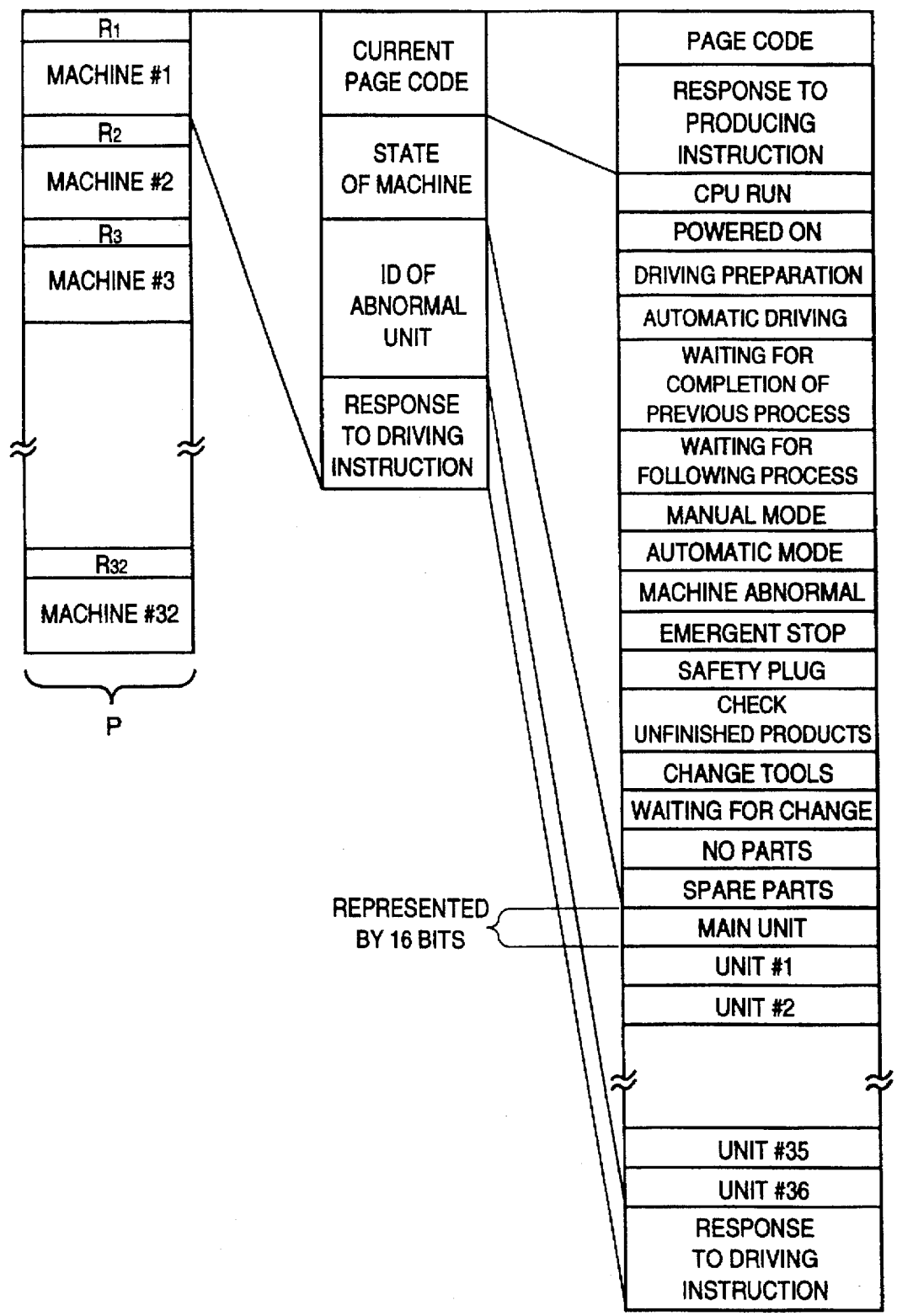
FIG. 4 is a diagram showing contents of data to be written in a brief datalink area.
Figure 5:
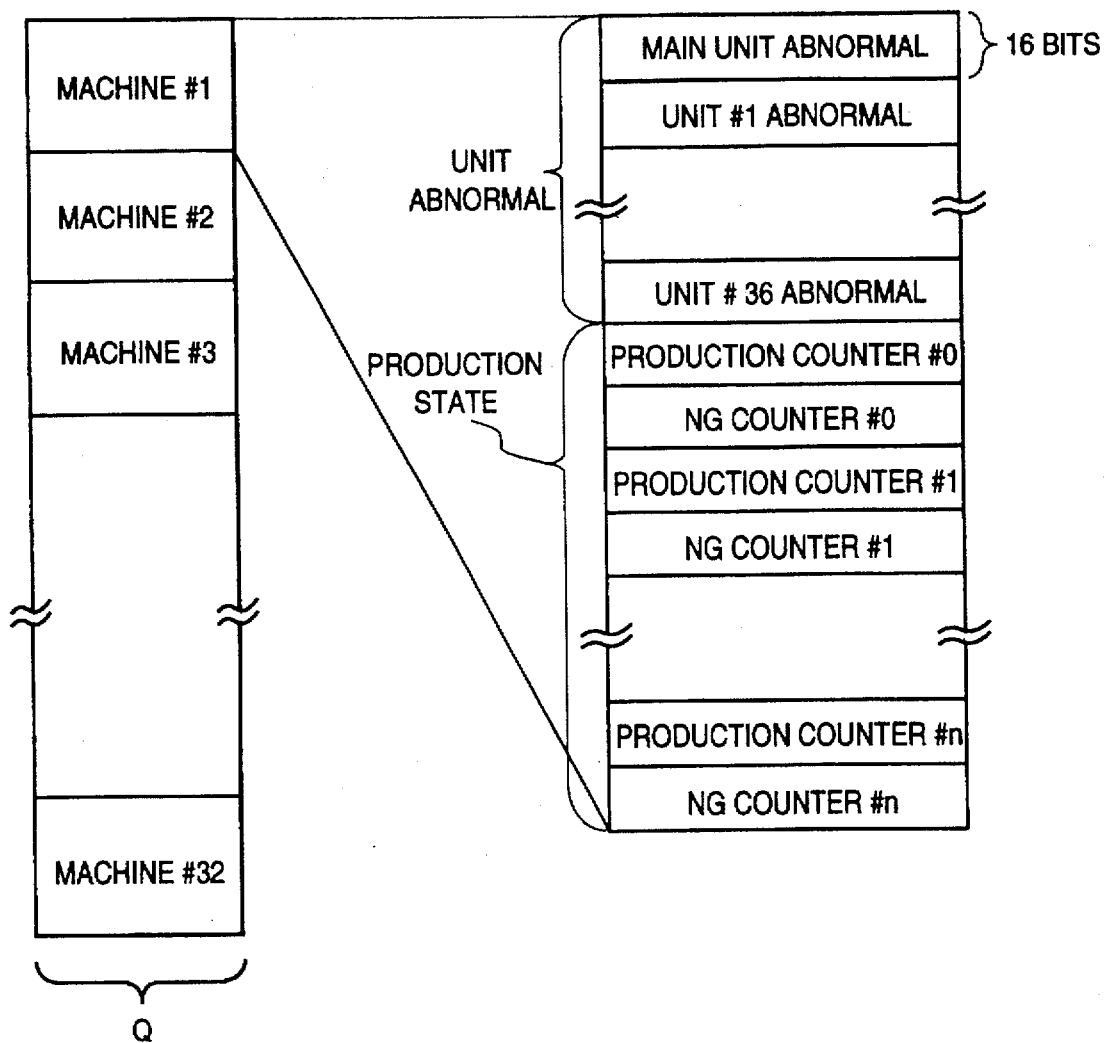
FIG. 5 is a diagram showing contents of data to be written in a detailed datalink area.

Referring to FIGS. 4 and 5, detailed contents of data to be written in the communication packet 5 will be explained. FIG. 4 is a diagram showing contents of data to be written in the brief datalink area, and FIG. 5 is a diagram showing contents of data to be written in the detailed datalink area.

(Information in the Brief Datalink Area)

First, in FIG. 4, predetermined brief information on the producing machines #1 to #32 is written in the brief datalink area P. In the following example, the brief information on the producing machine #1 represents that on the other producing machines #2 to #32. The brief information on the producing machine #1 consists of data showing "current page code", "state of machine", "ID of abnormal unit", and "response to driving instruction".

An area for the "current page code" consists of data areas for "page code" and for "response to producing instruction".

Data written in the area for "page code" represents a page code designated by the host computer 4 when it is read by the producing machine #1, whereas it represents a page code corresponding to a page of the detailed information in the producing machine #1 currently stored in the detailed datalink area in accordance with the page code designated by the host computer 4 when it is read by the host computer 4.

Data written in the area for "response to producing instruction" is responded data used for confirming whether or not a producing instruction was received normally by the producing machine #1 when the host computer 4 outputs the producing instruction (including a lot number of unfinished products, a number of lots, and code of the unfinished products) to the producing machine #1 (the first machine in a production line, e.g., a parts-feeding-device) at beginning of production.

The data representing "page code" and the data representing "response to producing instruction" are independent data, and the areas for these data is considered as system areas which are commonly owned by all the producing machines #1 to #32, although these system areas do not relate to each other.

An area for the "state of machine" is mainly for data describing operational situation of the producing machine #1. It consists of data areas for "CPU run", "powered on", "driving preparation", "automatic driving", "waiting for completion of previous process", "waiting for following process", "manual mode", "automatic mode", "abnormal machine", "emergent stop", "safety plug", "check unfinished products", "change tools", "waiting for change", "no parts", and "spare parts".

Data written in a data area for "CPU run" shows whether or not CPU is working normally. Data written in a data area for "powered on" shows whether or not the producing machine #1 is turned on. Data written in a data area for "driving preparation" shows whether or not the producing machine #1 is in a state where coolant is provided. Data written in a data area for "automatic driving" shows whether or not the producing machine #1 is automatically driven. Data written in data areas for "waiting for completion of previous process" and "waiting for following process" show that the producing machine #1 is waiting for completion of previous process or waiting for following process, and during these waiting states, no unfinished product is supplied. Data written in a data area for "manual mode" shows whether or not the producing machine #1 is under manual operation. Data written in a data area for "automatic mode" shows whether or not the producing machine #1 is under automatic operation. Data written in a data area for "machine abnormal" shows whether or not any trouble has been occurred in any of the plurality of units constructing the producing machine #1. Data written in a data area for "emergency stop" shows the producing machine #1 is unusually stopped by an operator by pressing an emergency stop button. Data written in a data area for "safety plug" shows whether a safety guard fence provided around the producing machine #1 is open or closed. Data written in a data area for "check unfinished products" provides information on acceptance quality level (AQL). Data written in a data area for "change tools" indicates that a tool has to be replaced since it is used more than 10,000 times, for instance. Data written in a data area for "waiting for change" shows a state of the producing machine #1 waiting for changing kinds of unfinished products which is to be processed. Data written in a data area for "no parts" shows whether or not predetermined parts are provided in the producing machine #1.

An area for "ID of abnormal unit" is where data indicating in which unit out of the 36 units constructing the producing machine #1, a trouble occurred is written. The area for "ID of abnormal unit" consists of data areas for "main unit" (e.g., conveyance machine), "unit #1" (e.g., fraise machine), "unit #2" (e.g., drill), for "unit #3" (e.g., drill), and so on. Each of "main unit" and "unit #1" to "unit #36" holds data whether or not each of main unit and the units #1 to #36 are normal.

The "response to driving instruction" shows data used for confirming whether or not the units #1 to #36 of the producing machine #1 finished preparatory driving in accordance with a start-driving instruction from the host computer 4 to the producing machine #1 by the host computer 4. Here, the driving instruction instructs to execute operations, such as start and stop, of machines on the production line by remote control from the host computer.

Note that the brief information on only the producing machine #1 is explained in the above-described embodiment, however, the producing machines #2 to #32 also store the same data indicating the "current page code", "state of machine", "ID of abnormal unit", and "response to driving instruction" as the brief information.

(Information in the Detailed Datalink Area)

Next, referring to FIG. 5, the contents of data to be written in the detailed datalink area will be explained.

As shown in FIG. 5, detailed information corresponding to a predetermined brief information on the producing machine #1 to #32 is stored in the detailed datalink area Q in accordance with the page code designated by the host computer. In following, the detailed information on the producing machine #1 is described as a representative one as in the case described with reference to FIG. 4. The detailed information on the producing machine #1 consists of data areas for showing that "a unit is abnormal" and "a production state".

Data area for showing that "a unit is abnormal" in the machine #1 is divided into areas for showing "main unit abnormal", "unit #1 abnormal", to "unit #36 abnormal", and each area is assigned for each unit. Data written in the data area for showing "main unit abnormal" shows that the main unit of the machine #1 is not normal, for example.

Further, the data area for showing "a production state" is divided into data areas for "production counter #0" to "production counter #n" and "NG counter #0" to "NG counter #n", and each area is assigned for each of stages of unfinished products #1 to #n. Data written in the data area for "production counter #1" indicates the number of unfinished products processed by the unit #1 (e.g., fraise unit) of the machine #1, and data written in the data area for "NG counter #1" indicates the number of sub-standard unfinished products processed by the unit #1 of the machine #1.

Figure 6:
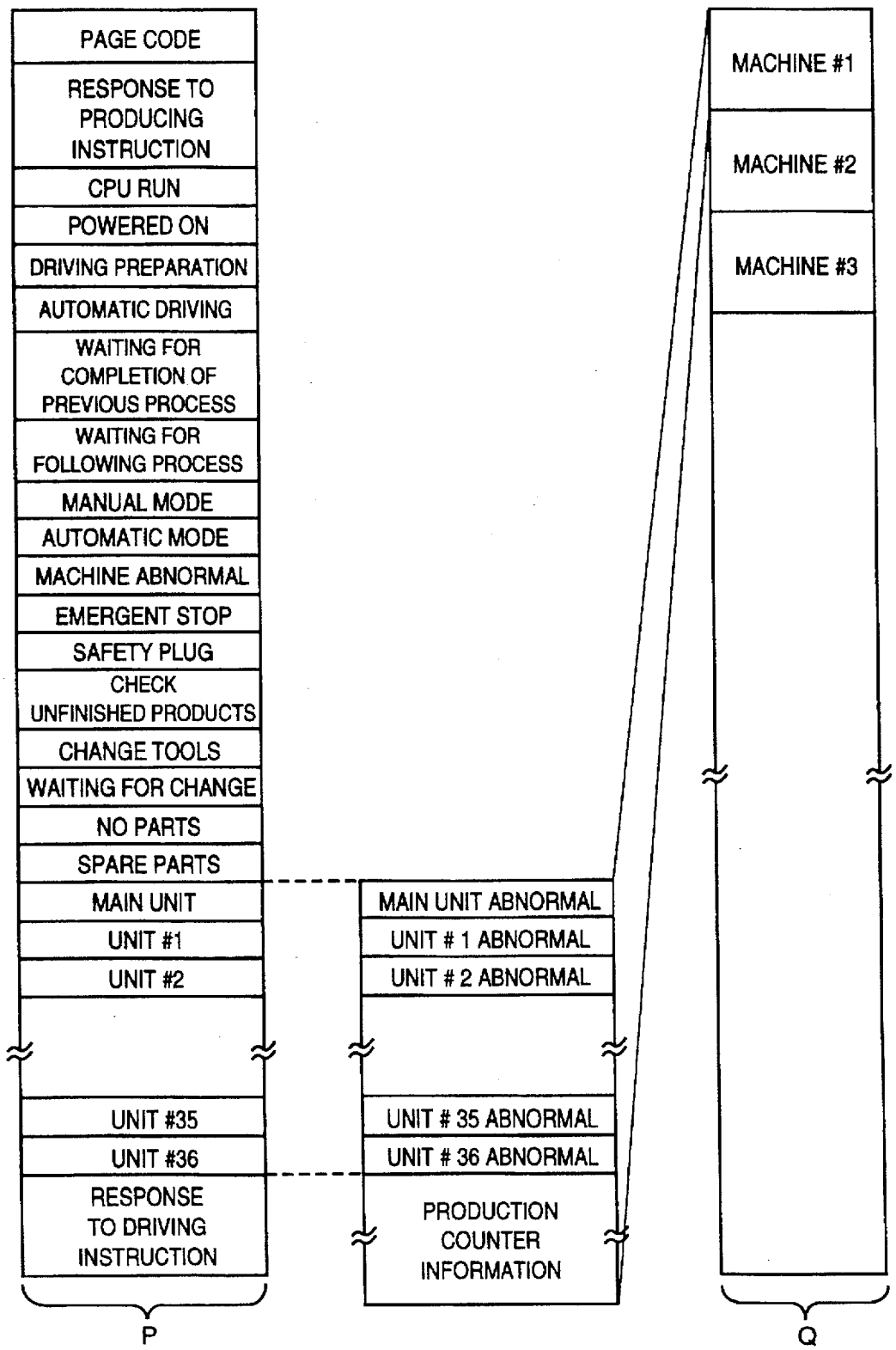
FIG. 6 is a diagram showing a correspondence relationship between the data written in the brief datalink area and the data written in the detailed datalink area.

As shown in FIG. 6, each of the "main unit abnormal" and "unit #1 abnormal" to "unit #n abnormal" in the detailed datalink area is composed of 16 bits. On the contrary, each "ID of abnormal unit" shown in FIG. 4 is composed of 1 bit.

Further, the "ID of abnormal unit" in FIG. 4 respectively corresponds to data showing that "a unit is abnormal". "ID of abnormal unit" generally designates that the unit is not in normal state, whereas "abnormal state of unit" indicates detailed abnormal items of the unit. By composing the detailed datalink area as above, the area for showing that "a unit is abnormal" in the detailed datalink area is able to indicate maximum of 16 abnormal items of each unit (refer to FIG. 11).

Note that the detailed information on only the machine #1 is described referring to FIG. 5, however, data showing that "a unit is abnormal" and "a production state" of the producing machines #2 to #32 is stored in the respective producing machines #2 to #32 as detailed information.

Further, data showing that "a unit is abnormal" and "a production state" of each of the producing machines #1 to #32 written in response to the host computer is shown in FIG. 5. However, in this embodiment, data, shown in FIG. 7, indicating "state of tool" and "operational state of normal unit" (not shown) which is stored in the detailed datalink area is also stored as detailed information.

Figure 7:
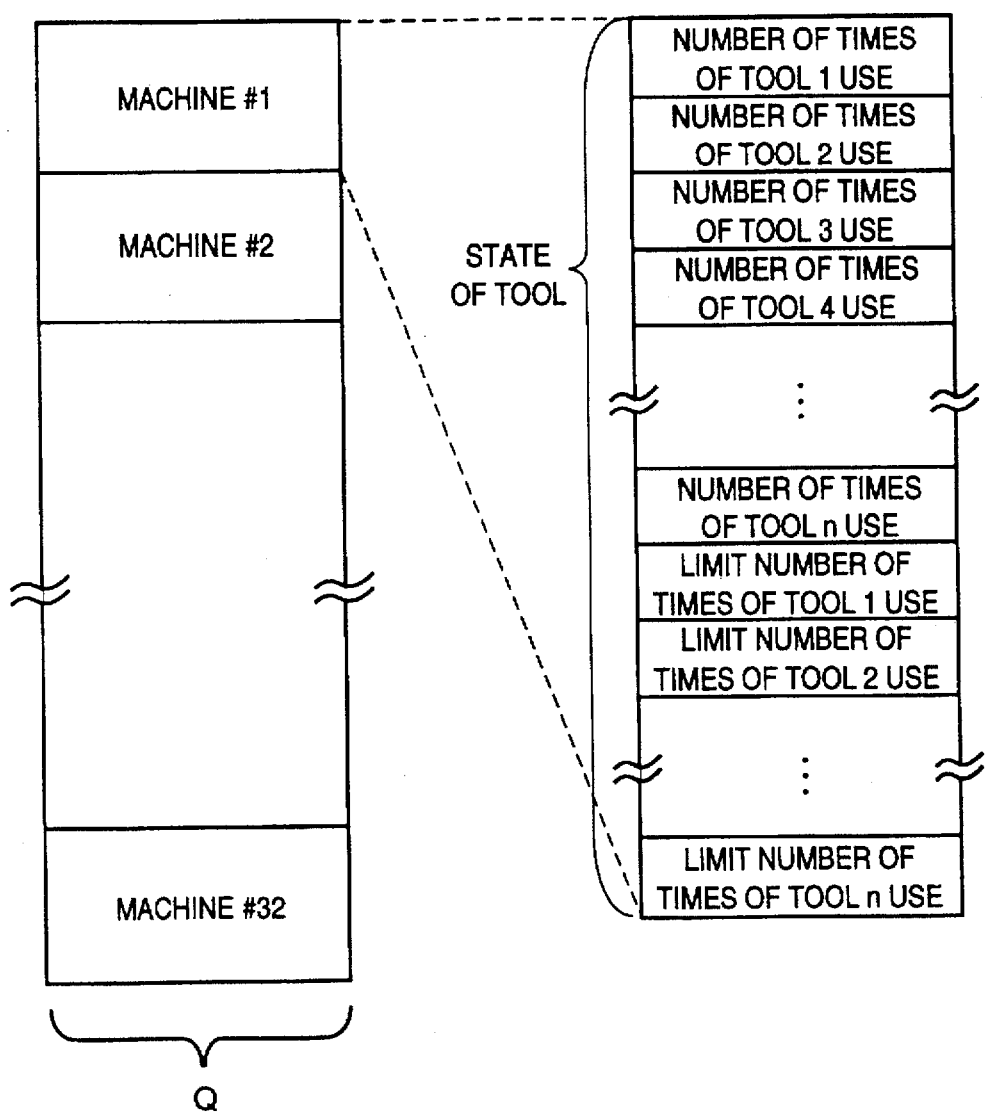
FIG. 7 shows contents of data to be written in the detailed datalink area.

Referring to FIG. 7, a data area for showing "state of tool" of the machine #1 is divided into areas for showing "number of times of tool use" and "limit number of times of tool use". The data area for showing "number of times of tool use" is further divided into areas for showing "number of times of tool 1 use", "number of times of tool 2 use"~"number of times of tool n use" for respective tools. Data written in the area for showing "number of times of tool 1 use" indicates the number of times the tool 1 has been used, for example.

Further, the data area for showing "limit number of times of tool use" is divided into "limit number of times of tool 1 use" to "limit number of times of tool n use" for respective tools. Data written in the area for showing "limit number of times of tool 1 use" indicates the limit number of times to use tool 1, for example.

Besides these detailed information, data, such as products' quality data and operational cycle time data, may be stored in another pages of the detailed information stored in the producing machines #1 to #32.

<First Operational Example of the Host Computer>

Figure 8:
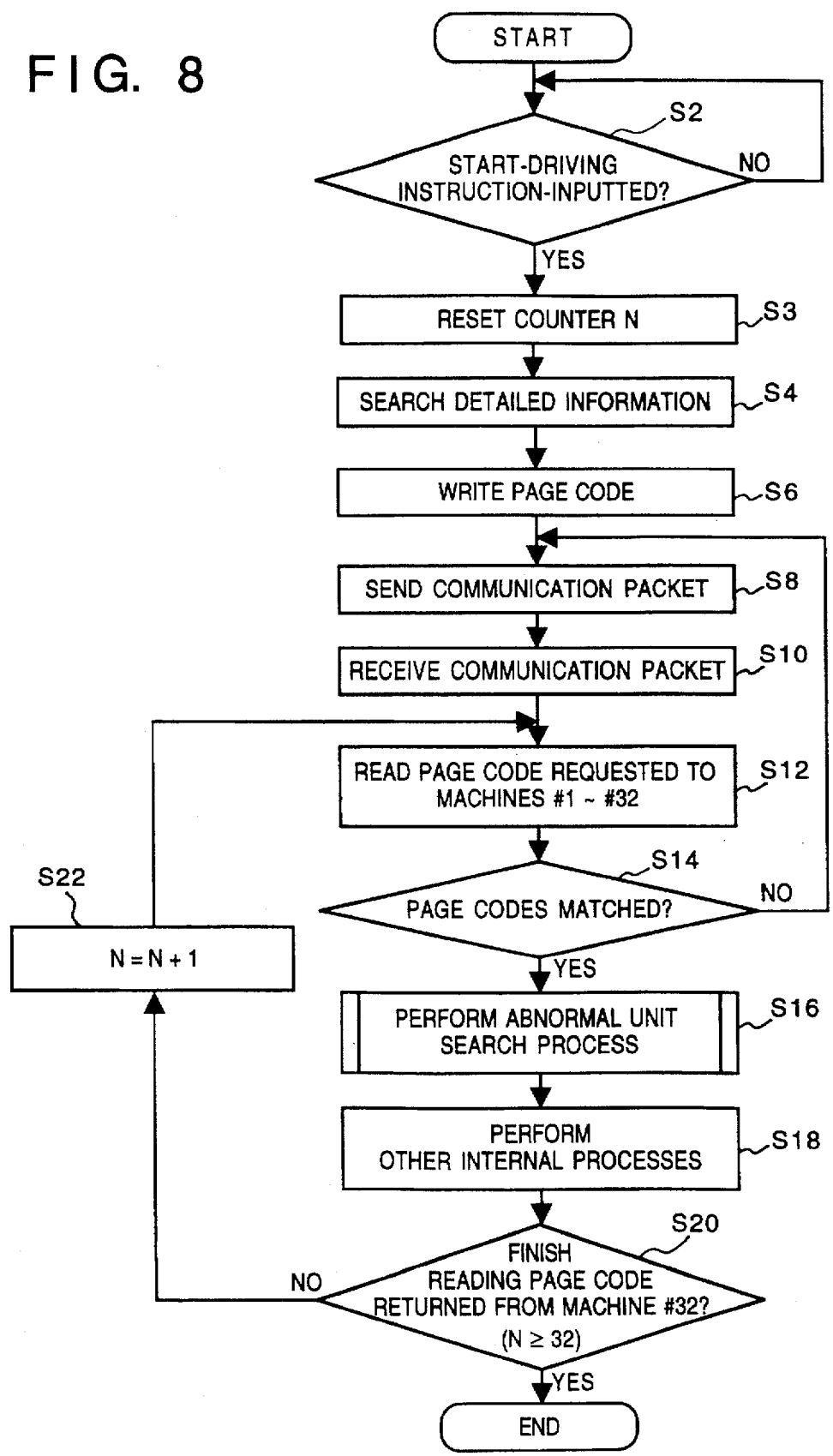
FIG. 8 is a flowchart of a main routine explaining an operational sequence of a host computer in a network system according to the embodiment.
Figure 9:
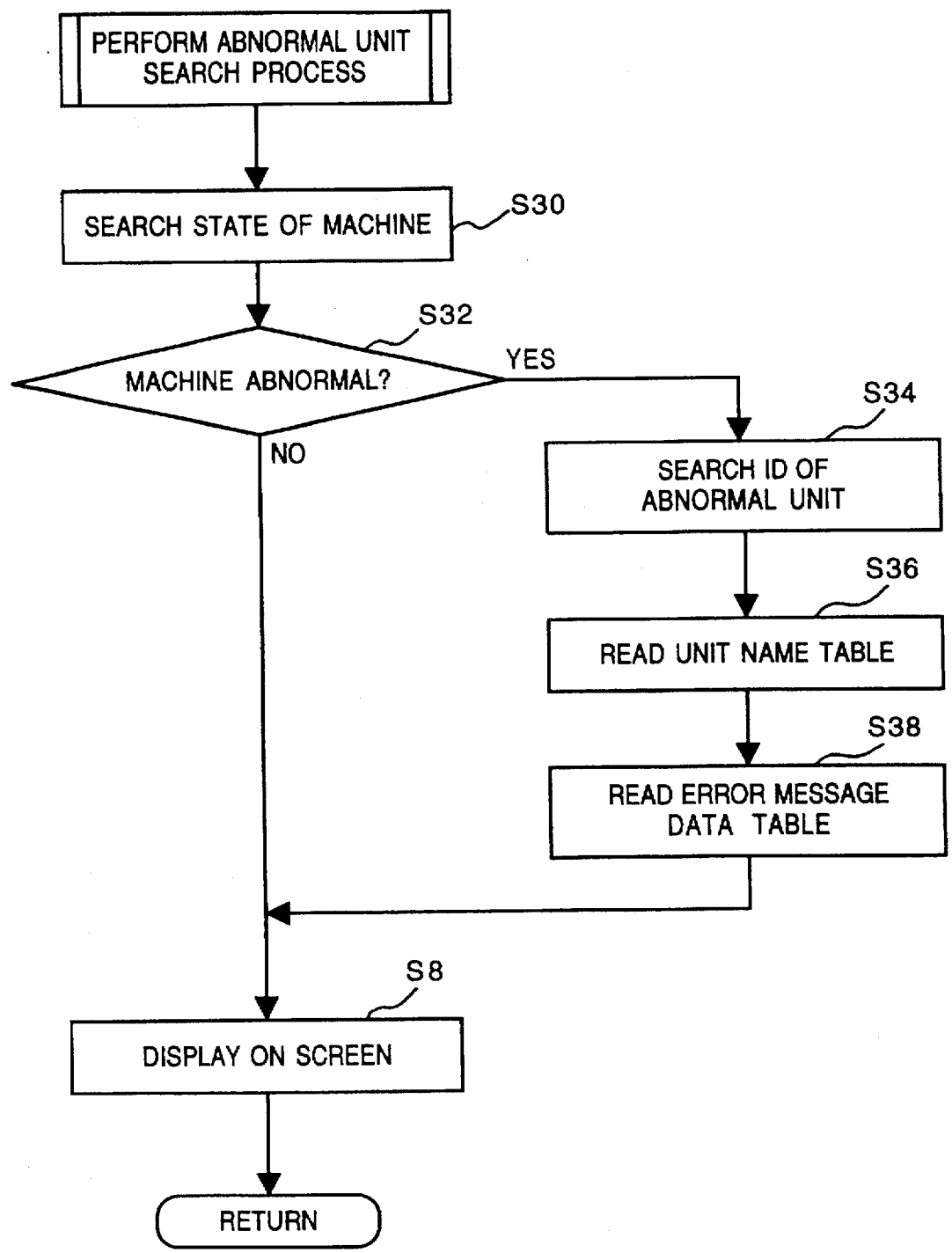
FIG. 9 is a flowchart of a subroutine explaining an operational sequence to detect an abnormal state of an unit performed by the host computer.

Regarding an operational sequence of the host computer, an operation for detecting abnormal state of each unit when each unit starts being driven will be explained as a first operational example. FIG. 8 is a flowchart of a main routine explaining an operational sequence of a host computer in a network system according to this embodiment. Further, FIG. 9 is a flowchart of a subroutine explaining an operational sequence to detect an abnormal state of an unit performed by the host computer. In the following first operational example, when a start-driving instruction is inputted by an operator to the host computer, the host computer automatically starts performing a sequence of searching "abnormal state of unit".

Figure 10:
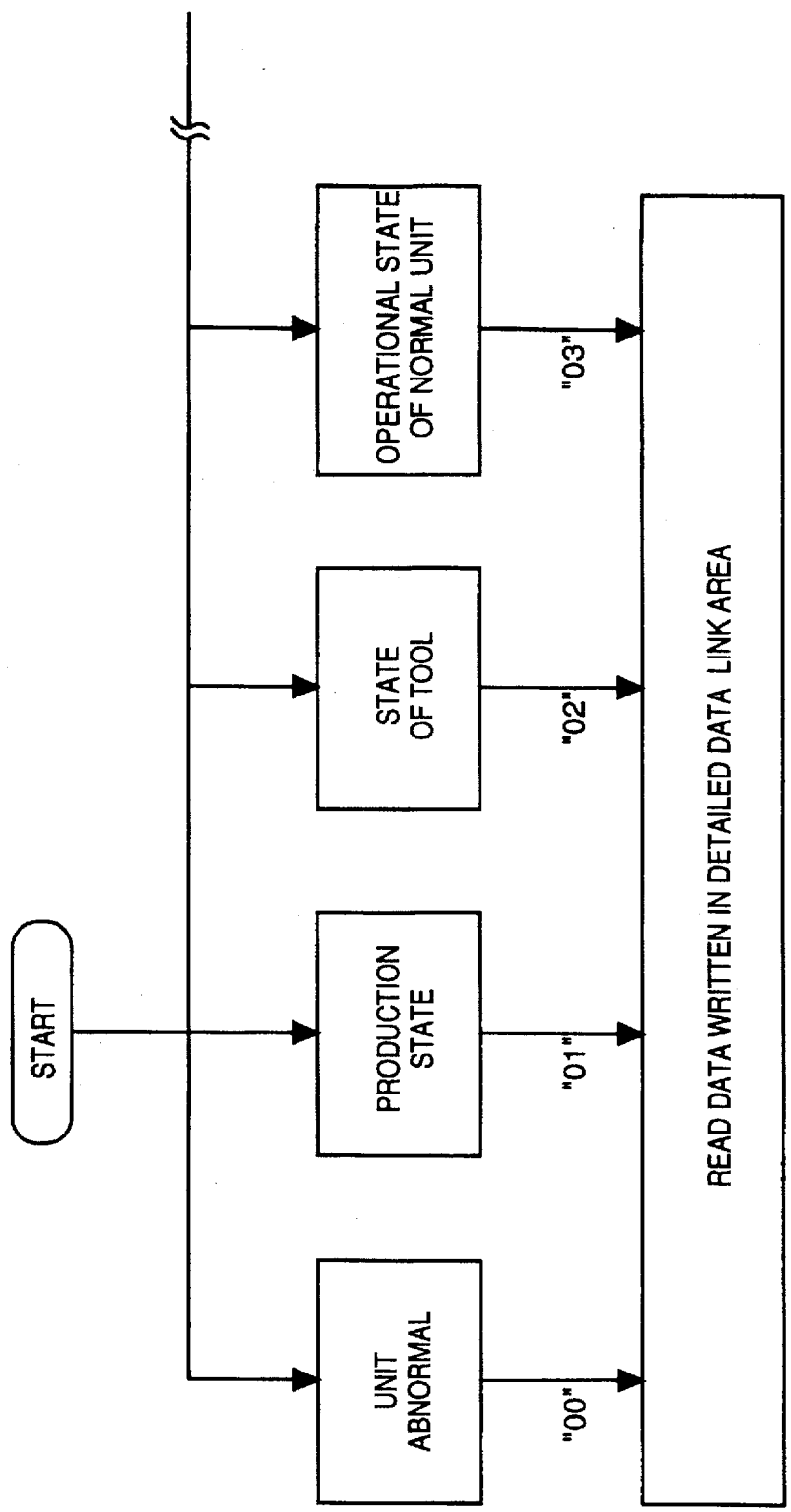
FIG. 10 is a flowchart explaining process to write a page code in FIG. 8.

Referring to FIG. 8, when the process starts, whether or not a start-driving instruction is inputted by the operator to the host computer is determined at step S2. If it is (YES at step S2), a counter N is reset at step S3, and the process proceeds to step S4 where the host computer searches detailed information to be fed when the start-driving instruction is inputted. Then, at step S6, after a page code corresponding to the detailed information to be fed, searched at step S4, is written in the page designation area for each of the production machines #1 to #32 in the brief datalink area (page code "00", indicating "abnormal state of unit" as shown in FIG. 10, for instance), the communication packet is sent at step S8. At step S10, the host computer 4 receives the communication packet circulated through the producing machines #1 to #32 and written with detailed data in accordance with the designated page code. Each of the producing machines #1 to #32 writes detailed information, stored in a page corresponding to the page code which is designated in the page designation areas R31 to R32, in the detailed datalink area Q. Meanwhile, in the page designation area R1 to R32, each producing machine writes a page code corresponding to a page of the detailed information which is written in the detailed datalink area Q. At step S12, the host computer 4 reads the page code requested the production machines #1 to #32 from a memory of itself at step S6. At step S14, whether or not the page code requested to the production machines #1 to #32 matches the page code written in the page designation area for each of the producing machines #1 to #32 is sequentially determined. If the page code requested to the production machine #1 matches the page code returned from the production machine #1, for example, (YES at step S14), the process proceeds to step S16, whereas if the codes do not match (NO at step S14), the process returns to step S8 where the communication packet is sent again.

At step S16, a process of searching abnormal unit is performed for each producing machine which returned the page code that matched the page code requested to the producing machine. Then at step S18, other internal processes are performed, and at step S20, whether or not the processes of matching page codes and of searching abnormal unit have been performed for all the producing machines #1 to #32 is determined ($N \geq 32$). If they have (YES at step S20), this program is completed, whereas if they have not (NO at step S20), the process proceeds to step S22 where the counter N is incremented by one as the processes of matching page codes and of searching abnormal unit for each of the producing machines #1 to #32 finish. Then the process returns to step S12 and the processes subsequent to step S12 are performed for the unprocessed producing machines.

FIG. 10 is a flowchart explaining process to write a page code in FIG. 8.

Referring to FIG. 10, the detailed information is related to page codes by a correspondence table showing one to one correspondence. For example, a page code "00" is assigned to "unit abnormal", a page code "01" is assigned to "production state", a page code "02" is assigned to "state of tool", a page code "03" is assigned to "operational state of normal unit", and so on.

The subroutine operational sequence of the process of searching an abnormal unit, shown in FIG. 8, will be explained with reference to FIG. 9. Further, FIG. 11 shows "state of machine" and "ID of abnormal unit" in the communication packet, an unit name table and an error message data table stored in a memory of the host computer.

Figure 11:
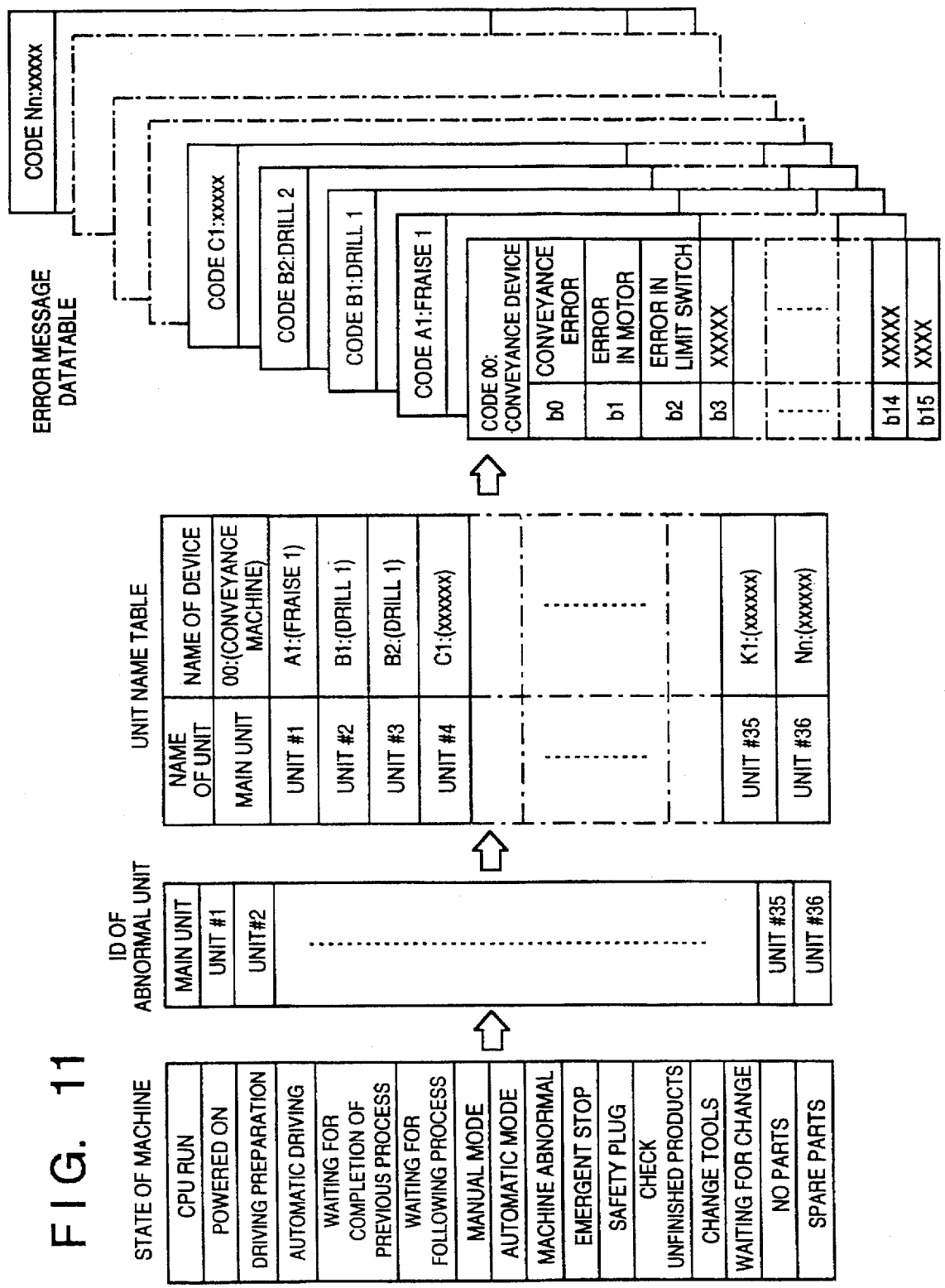
FIG. 11 shows an unit name table and an error message data table stored in a memory of the host computer.

Referring to FIG. 9, at step S30, by detecting data stored in the area for showing the "state of machine" in the brief datalink area in the communication packet 5 shown in FIG. 11, the host computer searches operational states of the producing machines #1 to #32. Next at step S32, by analyzing values of flags written in the data area for showing the "abnormal machine" in the "state of machine", whether or not any problem has occurred in any producing machine is determined. If it has (YES at step S32), the process moves to step S34, where in which unit of the machine the problem has occurred is searched based on the data written in the area for showing the "ID of abnormal unit" shown in FIG. 11. After the abnormal unit is detected at step S34, at step S36, a name of the unit in which a problem has occurred is read from the "unit name table" shown in FIG. 11. Next at step S38, by referring to the "error message data table", shown in FIG. 11, the content of trouble corresponding to the name of the unit in which a problem has occurred is read. This "error message data table" can be commonly used for similar units in a case where a plurality of similar units are used in the producing machines #1 to #32.

Then the process proceed to step S40 where the name of the unit in which a problem has occurred and the content of the trouble are displayed on a CRT screen.

Whereas, in a case where it is determined that no trouble has occurred in the producing machines at step S32 (NO at step S32), the process moves to step S40 where the normal operational state is displayed on the CRT screen.

According to the information communicating system of the present embodiment, the "error message data table" can be commonly used for the similar units in the producing machines, therefore, it is possible to reduce the size of the memory of the communication packet.

Conventionally, since abnormal state search process is performed for all the units sequentially when the processes at steps S34 to S38 are performed and the contents of a problem are always supervised, if the number of units and the number of abnormal items are extremely large, the supervising cycle increases greatly, and there is a fear that correct information can not be obtained.

On the contrary, according to the present invention, first, an abnormal state of a machine is detected from the state of the entire machine at steps S30 and S32, and second, an abnormal unit is detected at step S34. Thereafter, the contents of a problem of the unit in which the problem has occurred are searched at steps S36 and S38. Accordingly, it is possible to shorten a processing time as well as to reduce the amount of information in a communication packet.

Further, in this embodiment, the brief datalink area is divided into three hierarchies and data in each hierarchy is supervised in accordance with necessity, thus it is possible to greatly increase processing efficiency.

<Second Operational Example of the Host Computer>

Figure 12:
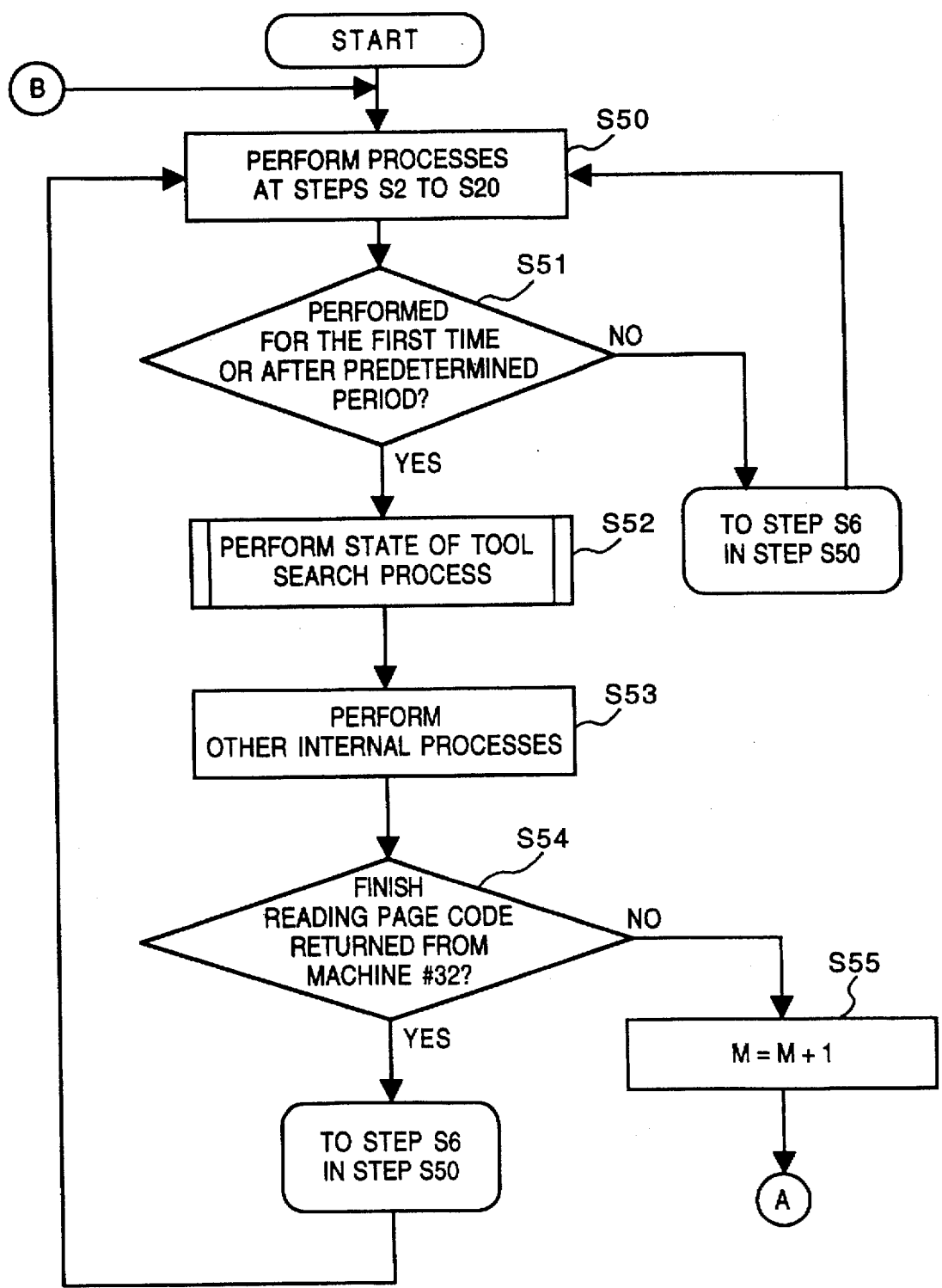
FIG. 12 is a flowchart of a main routine explaining an operational sequence of the host computer as a second operational example according to the embodiment.

Next, an operation of the host computer for searching abnormal unit and state of tool when the system starts driving will be explained as a second operational example. FIG. 12 is a flowchart of a main routine explaining an operational sequence of the host computer as a second operational example. Further, FIG. 13 is a flowchart of a subroutine explaining an operational sequence to search state of tool of each unit performed by the host computer. In the following second operational example, the host computer always supervises "abnormal state of unit" while the producing machines are running since the operator inputs a start-driving instruction, and searches "state of tool" after every predetermined period (once in every 1 to 4 hours, for instance).

Referring to FIG. 12, when the process is stared, the host computer performs processes of steps S2 to S20, explained with reference to FIG. 8, at step S50. Thereafter, at step S51, after the start-driving instruction is inputted, whether or not the process for searching the state of tool is to be performed initially or $n^{th}$ time after the predetermined period (e.g., 1 to 4 hours) since the previous process is determined. If it is (YES at step S51), the process moves to step S52, whereas if it is not (NO at step S51), the process returns to aforesaid step S6 which is included in step S50.

At step S52, process for searching the state of toll of unit is performed for each producing machine. Thereafter at step S53, other internal processes are performed, and at step S54, whether or not the processes of matching page codes and of searching abnormal unit have been performed for all the producing machines #1 to #32 is determined. If they have (YES at step S54), the process returns to step S6 which is included in step S50. Whereas, if they have not (NO at step S54), the process proceeds to step S55 where a counter M is incremented by 1 as the processes of matching page codes and of searching abnormal unit for each machine finish. Then the process proceeds to step S66 which will be described later, and performs processes of matching page codes and of searching abnormal unit on the producing machines.

Next, the operational sequence of the subroutine of the process of searching state of tool of the unit, shown in FIG. 12, will be explained with reference to FIG. 13.

In FIG. 13, after a page code (in the second operational example, page code "02" indicating "state of tool" shown in FIG. 10) is written in the page designation area for each of the producing machines #1 to #32 in the brief datalink area at step S60, a communication packet is sent at step S62. Thereafter, at step S64, the communication packet which circulated through the producing machines #1 to #32 and which is written with detailed data corresponding to the page code designated for the producing machines #1 to #32 is received. At step S66, the host computer reads the page code requested to the production machines #1 to #32 at step S60 from its memory. At step S68, whether or not the page code designated to the production machines #1 to #32 matches the page code written in the page designation area of the producing machines #1 to #32 is sequentially determined. If the page code designated to the production machine #1 matches the page code returned from the producing machine #1, for example (YES at step S68), the process proceeds to step S70, whereas if the page codes do not (NO at step S68), the process returns to step S62 where the communication packet is sent again.

At step S70, by detecting data written in the area for showing "state of tool" in the detailed datalink area, the host computer obtains the number of times the tool in a unit of each of the producing machines #1 to #32 is used. Next, at step S72, whether or not there is a tool which is used equal to or greater than the predetermined limit number of times in a unit is determined. If there is (YES at S72), the process proceeds to step S78 where the name of the tool which has been used equal to or greater than the limit number of times and the name of the unit including the tool are read by referring to a data table (not shown) on the basis of the data written in the area for showing "state of tool". Regarding this not-shown data table, in a case where similar units or tools are used in the machines #1 to #32, the data table can be commonly used for the similar units, as in the case of the "error message data table".

The process proceeds to step S74, where the name of the tool which has been used equal to or greater than the limit number of time and the unit name including the tool are displayed on a CRT screen.

Whereas, in a case where there is no tool which has been used equal to or greater than the limit number of times at step S72 (NO at step S72), the process moves to step S74 where a normal operational state is displayed on the CRT screen.

Thereafter, the process proceeds to step S76 where whether or not a stop-driving instruction is inputted by an operator is detected. If it is (YES at step S76), the program is interrupted, whereas if it is not (NO at step S76), the process returns to step S50 shown in FIG. 12.

In the above-described second operational example, it is possible to shorten the processing time as well as to reduce the amount of information in the communication packet.

Further, the brief datalink area is divided into three hierarchies and data in each hierarchy is supervised when necessary, thus it is possible to greatly increase processing efficiency.

The present invention is not limited to the above embodiments and various changes and modifications can be made within the spirit and scope of the present invention.

For example, at step S4 in FIG. 8, a case where, when the start-driving instruction is inputted, the host computer searches predetermined detailed information of "abnormal unit", however, an operator may select detailed information such as the one shown in FIG. 10, and input the information to the host computer.

Accordingly, to appraise the public of the scope of the present invention, the following claims are made.

What is claimed is:

1. An information communicating apparatus comprising:
   communication packet of predetermined size; and
   a first communication node,
   wherein said communication packet consists of:
   a first area for predetermined item information written by each of a plurality of communication nodes which include said first communication node; and
   a second area for detailed information relating to the predetermined item information for each of said plurality of communication nodes, and wherein said first communication node which is included in said plurality of communication nodes consists of:
   generating means for generating said communication packet for designating necessary predetermined item information and necessary detailed information to be written in said communication packet; and
   sending means for sending the generated communication packet to a second communication node which is included in said plurality of communication nodes, further wherein said predetermined item information stored in each of said plurality of communication nodes is interchanged by using said communication packet via a common communication line to which said plurality of communication nodes are connected.

2. The information communicating apparatus according to claim 1, wherein said second communication node comprises:
   receiving means for receiving said communication packet sent from said first communication node; and
   sending means for writing the detailed information, designated by said first communication node, in the second area in said communication packet and sending said communication packet.

3. The information communicating apparatus according to claim 1, wherein said first communication node comprises:
   searching means for searching the predetermined item information written in said first area;
   designating means for designating the detailed information corresponding to the searched predetermined item information in accordance with a search result by said searching means; and
   determination means for determining whether or not the designated detailed information is written in said communication packet returned from said second communication node.

4. The information communicating apparatus according to claim 1, wherein the predetermined item information is brief information of the detailed information written in said second area.

5. The information communicating apparatus according to claim 1, wherein said first communication node writes a designation code for designating the detailed information corresponding to the searched predetermined item information.

6. The information communicating apparatus according to claim 1, wherein said first communication node is a managing node for managing said second communication node, and wherein said second communication node is each of a plurality of producing machines connected to the common communication line via a sequencer provided in each communication node.

7. The information communicating apparatus according to claim 1, wherein the predetermined item information consists of data showing operational state of each producing machine, state of occurrence of abnormal unit, and state of completion of initial operation.

8. The information communicating apparatus according to claim 7, wherein each of said plurality of producing machines consists of a plurality of units for processing and assembling parts, and wherein the detailed information is data showing at least situation of use of tools, a state of producing parts, and abnormal operation state, of each of said plurality of units.

9. The information communicating apparatus according to claim 7, wherein said first communication node has a data search table used for searching a name of an abnormal unit and contents of its abnormal state on the basis of the data showing the abnormal operation state, and wherein the data search table is used in common by each of said plurality of producing machines.

10. The information communicating apparatus according to claim 9, wherein said first communication node has display means for displaying the name of abnormal unit and the contents of its abnormal state searched by referring to the data search table.

11. An information communicating apparatus comprising:
communication packet of predetermined size; and
a second communication node,
wherein said communication packet consists of:
a first area for predetermined item information written by each of a plurality of communication nodes which include a first communication node; and
a second area for detailed information relating to the predetermined item information for each of said plurality of communication nodes, and wherein said second communication node which is included in said plurality of communication nodes consists of:
receiving means for receiving said communication packet sent from the first communication node which is included in said plurality of communication nodes,
writing means for writing the necessary detailed information designated by said first communication node in said second area in said communication packet; and
sending means for sending the communication packet to the first communication node, further wherein said information communicating apparatus receives said communication packet which holds said predetermined item information stored in said first communication node and which is sent from said first communication node via a common communication line to which said plurality of communication nodes are connected.

12. The information communicating apparatus according to claim 11, wherein said first communication node comprises:
searching means for searching the predetermined item information written in said first area;
designating means for designating the detailed information corresponding to the searched predetermined item information in accordance with a search result by said searching means; and
determination means for determining whether or not the designated detailed information is written in said communication packet returned from said second communication node.

13. The information communicating apparatus according to claim 11, wherein the predetermined item information is brief information of the detailed information written in said second area.

14. The information communicating apparatus according to claim 11, wherein said first communication node is a managing node for managing said second communication node, and wherein said second communication node is each of a plurality of producing machines connected to the common communication line via a sequencer provided in each communication node.

15. The information communicating apparatus according to claim 14, wherein the predetermined item information consists of data showing operational state of each producing machine, state of occurrence of abnormal unit, and state of completion of initial operation.

16. The information communicating apparatus according to claim 15, wherein each of said plurality of producing machines consists of a plurality of units for processing and assembling parts, and wherein the detailed information is data showing at least situation of use of tools, a state of producing parts, and abnormal operation state, of each of said plurality of units.

17. An information communicating method in which predetermined item information stored in each of a plurality of communication nodes is interchanged by using a communication packet via a common communication line to which said plurality of communication nodes are connected, wherein said communication packet consists of:
a first area for predetermined item information written by each of said plurality of communication nodes which include said first communication node; and
a second area for detailed information relating to the predetermined item information for each of said plurality of communication nodes, performs:
a designating step of designating necessary predetermined item information and necessary information corresponding to the designated predetermined item information, both of which are to be written in said communication packet; and
a sending step of sending said communication packet, in a first communication node which is included in said plurality of communication nodes, and further performs:
a receiving step of receiving said communication packet sent from said first communication node;
a writing step of writing the necessary detailed information designated by said first communication node in said second area in said communication packet; and
a sending step of sending the communication packet to a first communication node, in a second communication node which is included in said plurality of communication nodes.

18. The information communicating apparatus according to claim 17, wherein said first communication node sends said communication packet after performing steps of:

searching the predetermined item information written in said first area; and designating the detailed-information corresponding to the searched predetermined item information in accordance with a search result at said searching step, and determines whether or not the designated detailed information is written in said communication packet returned from said second communication node.

19. The information communicating apparatus according to claim 17, wherein the predetermined item information is brief information of the detailed information written in said second area.

20. The information communicating apparatus according to claim 17, wherein said first communication node writes a designation code for designating the detailed information corresponding to the searched predetermined item information.

21. The information communicating apparatus according to claim 17, wherein said first communication node is a managing node for managing said second communication node, and wherein said second communication node is each of a plurality of producing machines connected to the common communication line via a sequencer provided in each communication node.

22. The information communicating apparatus according to claim 21, wherein the predetermined item information consists of data showing operational state of each producing machine, state of occurrence of abnormal unit, and state of completion of initial operation.

23. The information communicating apparatus according to claim 21, wherein each of said plurality of producing machines consists of a plurality of units for processing and assembling parts, and wherein the detailed information is data showing at least situation of use of tools, a state of producing parts, and abnormal operation state, of each of said plurality of units.

24. The information communicating apparatus according to claim 23, wherein said first communication node has a data search table used for searching a name of an abnormal unit and contents of its abnormal state on the basis of the data showing the abnormal operation state, and wherein the data search table is used in common by each of said plurality of producing machines.

25. The information communicating apparatus according to claim 24, wherein said first communication node further performs a display step of displaying the name of abnormal unit and the contents of its abnormal state searched by referring to the data search table.

* * * * *